United States Patent
Mishina et al.

(10) Patent No.: US 7,193,235 B2
(45) Date of Patent: Mar. 20, 2007

(54) RADIATION IMAGE CONVERSION PANEL AND PREPARATION METHOD THEREOF

(75) Inventors: Noriyuki Mishina, Ome (JP); Takafumi Yanagita, Hachioji (JP); Akihiro Maezawa, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 278 days.

(21) Appl. No.: 10/944,502

(22) Filed: Sep. 17, 2004

(65) Prior Publication Data

US 2005/0067589 A1 Mar. 31, 2005

(30) Foreign Application Priority Data

Sep. 29, 2003 (JP) .............................. 2003-338464

(51) Int. Cl.
*G21K 4/00* (2006.01)

(52) U.S. Cl. ..................................... 250/580
(58) Field of Classification Search ................ 250/580, 250/581, 584
See application file for complete search history.

(56) References Cited

U.S. PATENT DOCUMENTS

| | | | | |
|---|---|---|---|---|
| 4,947,046 A | * | 8/1990 | Kawabata et al. | 250/484.4 |
| 6,835,940 B2 | * | 12/2004 | Morikawa et al. | 250/484.4 |
| 6,953,941 B2 | * | 10/2005 | Nakano et al. | 250/484.4 |
| 6,992,305 B2 | * | 1/2006 | Maezawa et al. | 250/484.4 |
| 2003/0047697 A1 | | 3/2003 | Iwabuchi et al. | |
| 2003/0160187 A1 | | 8/2003 | Nakano et al. | |

FOREIGN PATENT DOCUMENTS

JP  02003050298 A  *  2/2003

* cited by examiner

*Primary Examiner*—Otilia Gabor
(74) *Attorney, Agent, or Firm*—Frishauf, Holtz, Goodman & Chick, PC

(57) ABSTRACT

A radiation image conversion panel is disclosed, comprising on a support a stimulable phosphor layer comprising a stimulable phosphor, wherein the stimulable phosphor layer is layer formed of columnar crystals of a parent component of a stimulable phosphor and further thereon a layer formed of columnar crystals of the parent component and an activator component, wherein the second columnar crystals are formed with (200) orientation through vapor deposition. There is also disclosed a preparation method thereof.

17 Claims, 2 Drawing Sheets

RADIATION IMAGE CONVERSION PANEL AND PREPARATION METHOD THEREOF

FIELD OF THE INVENTION

The present invention relates to a radiation image conversion panel comprising on a support a stimulable phosphor layer containing a stimulable phosphor and a preparation method thereof.

BACKGROUND OF THE INVENTION

Conventionally, radiography using silver salts to obtain radiation images has been employed but there have also been developed radiographic imaging methods not using silver salts. Thus, for example, an imaging method is disclosed in which radiation that has been transmitted through an object is absorbed by stimulable phosphor, followed by exciting the phosphor with an energy to cause radiation energy accumulated in the stimulable phosphor to radiate in the form of fluorescence, and imaging is achieved by detecting the fluorescence, for example, as disclosed in U.S. Pat. No. 3,859,527. Specifically, there is known a radiation image conversion method in which a panel provided with a stimulable phosphor layer on a support is employed and one of or both of visible and infrared lights are used as an exciting energy.

Further, a radiation image conversion panel using a stimulable phosphor comprised of an alkali halide, such as CsBr as a parent component and activated with Eu, was proposed as a radiation image conversion method using a stimulable phosphor of high luminance, high sensitivity and enhanced sharpness. Specifically, the use of Eu as an activator is contemplated to result in enhanced X-ray conversion efficiency.

A radiation image conversion panel exhibiting further enhanced sharpness has been desired in the analysis of diagnostic images and an attempt was made to enhance sharpness as well as sensitivity by controlling the shape of stimulable phosphor particles as a means for improving sharpness. For example, JP-A No. 2-58000 (hereinafter, the term, "JP-A" refers to an unexamined Japanese Patent Application Publication) proposes a radiation image conversion panel comprising a support having a stimulable phosphor layer of columnar crystals formed by a gas phase deposition process and inclined at a prescribed angle to the direction normal to the support.

However, the foregoing stimulable phosphor layer having a columnar crystal structure results in disorder of the columnar crystal structure at the interface of the support so that exciting semiconductor laser is diffused at the bottom of the columnar crystal structure layer, leading to deteriorated sharpness.

As disclosed in JP-A 2003-50298, there is known a radiation image conversion panel in which a columnar crystal structure comprised of a parent component of a phosphor is formed through electron beam vapor deposition and further thereon, a columnar crystal structure comprised of a parent component of a phosphor and an activator component thereof is formed through electron beam vapor deposition to form a phosphor layer.

SUMMARY OF THE INVENTION

In the radiation image conversion panel described in the foregoing patent document, however, the crystal plane of the stimulable phosphor layer comprised of a parent component and an activator component is not prescribed and deterioration of luminance and sharpness becomes a problem. Further, since X-ray absorption characteristics of the radiation image conversion panel are not controlled, producing problems such that X-rays which has passed through the panel without being absorbed, are scattered or reflected behind the panel and the transmitted X-rays are re-absorbed by the panel, resulting in a lowering of contrast.

The present invention has come into being in light of the foregoing and it is therefore an object of the invention to provide a radiation image conversion panel not causing deterioration of luminance and sharpness and exhibiting superior contrast, and a preparation method thereof.

Thus, in one aspect the invention is directed to a radiation image conversion panel comprising on a support a stimulable phosphor layer comprising a stimulable phosphor, wherein the stimulable phosphor is comprised of a parent component and an activator component, and the stimulable phosphor layer comprises on the support a layer comprising columnar crystals of the parent component and further thereon a layer comprising columnar crystals of the parent component and the activator component, wherein the columnar crystals of the parent component and the activator component are formed by a vapor deposition process of crystal growth with (200) orientation.

In another aspect, the invention is directed to a method of preparing a radiation image conversion panel comprising on a support a stimulable phosphor layer comprising a stimulable phosphor, the method comprising (i) vapor-depositing a parent component of the stimulable phosphor onto the support to grow first columnar crystals to form the first layer and (ii) vapor-depositing an activator component together with the parent component onto the first columnar crystals to grow second columnar crystals to form the second layer, wherein the second columnar crystals are grown with (200) orientation.

DETAILED DESCRIPTION OF THE INVENTION

In a radiation image conversion panel according to this invention and a preparation method thereof, the stimulable phosphor layer is provided, on the support, with a layer comprising columnar crystals of the parent component and further thereon a layer comprising columnar crystals of the parent component and the activator component, and the columnar crystals of the parent component and the activator component are formed with (200) orientation through the vapor deposition process.

Herein, the expression, being formed with (200) orientation means that the columnar crystals are formed so as to grow predominantly in the direction of growing a (200) plane. In other words, the columnar crystals are allowed to grow predominantly in the [200] direction or in the direction perpendicular to a (200) plane. Growing predominantly in the direction of growing a (200) plane or in the [200] direction can be confirmed by X-ray diffractometry. Thus, when subjected to X-ray diffractometry, the columnar crystals exhibit an X-ray diffraction pattern with a highest intensity peak assigned to a (200) plane, in which other intensity peaks are not more than 80% of the highest intensity peak.

Formation of the phosphor layer comprised of a parent component and an activator component on the layer of the parent component layer, which functions as a substratum, can control a crystal plane, compared to formation of the phosphor layer directly on the support, leading to a stimulable phosphor layer exhibiting superior crystallinity. Controlling the growth direction of a stimulable phosphor layer to a (200) plane results superior contrast and markedly enhanced radiation image quality without deteriorating luminance and sharpness.

Figure 1:
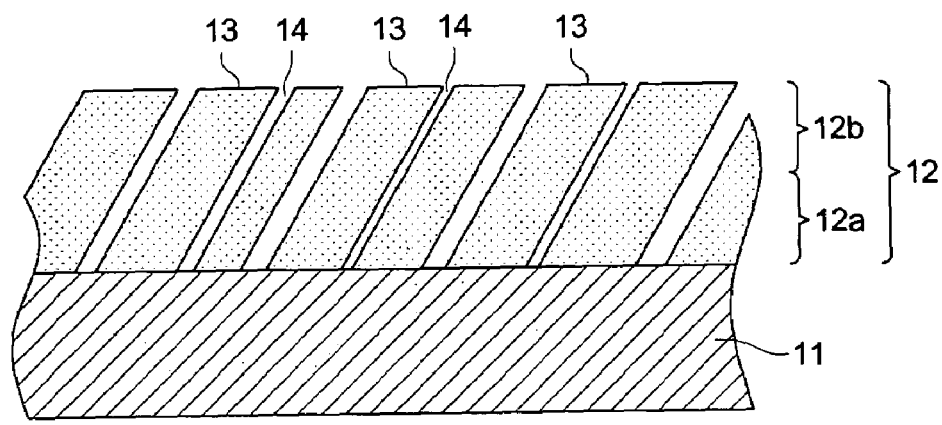
FIG. 1 is a sectional view of a stimulable phosphor layer formed on a support.

There will be detailed radiation image conversion panels relating to this invention and a preparation method thereof. As illustrated in FIG. 1, the radiation image conversion panel according to this invention comprises a support (11) having thereon a stimulable phosphor layer (12) comprising a stimulable phosphor of columnar crystals (13). The stimulable phosphor layer (12) is formed of a columnar crystal structure layer (12a) and a columnar crystal structure layer (12b). The columnar crystal structure layer (12a) which is composed of a parent component of a stimulable phosphor, is formed on the support (11) through gas phase deposition, and the columnar crystal structure layer (12b) which is composed of the parent component and an activator component of the stimulable phosphor, is formed on the columnar crystal structure layer (12a) through gas phase deposition.

It was found by the inventors that controlling the crystal plane of the layer (12b) of a stimulable phosphor layer to a (200) plane resulted in marked enhancement of radiation image quality with superior contrast, without causing deterioration in luminance and sharpness.

In FIG. 1, the numeral 13 designates a columnar crystal of a stimulable phosphor, while numeral 14 designates an interstice between columnar crystals (13).

The support (11) which can be optimally chosen from commonly known materials used for a support of conventional radiation image conversion panels, preferably is a quartz glass sheet, a sheet of metal such as aluminum, iron, tin, or chromium or a carbon fiber-reinforced resin sheet as a support for the stimulable phosphor layer prepared by a process of gas phase deposition.

The support (11) preferably has a resin layer to provide a smoother surface. Thus, the resin layer preferably contains compounds such as polyimide, polyethylene terephthalate, paraffin and graphite and the layer thickness is preferably 5 μm to 50 μm. The resin layer may be provided on the surface of the support, on the opposite side or on both sides thereof. Means for providing a resin layer on the support (11) include, for example, a pasting method and a coating method. In the pasting method, a pressure roller is employed, in which heating is made preferably at a temperature of 80 to 150° C. under a pressure of 4.90×10 to 2.94×10² N/cm at a transporting speed of 0.1 to 2.0 m/sec.

The total thickness of the stimulable phosphor layer, depending on the objective of application of a radiation image conversion panel and the kind of a stimulable phosphor, is preferably 50 to 2000 μm, more preferably 100 to 1000 μm, and still more preferably 400 to 900 μm to achieve effects of this invention. Further, the thickness of the second layer composed of a parent component and an activator component preferably is 300 to 800 μm. A thickness of not less than 300 μm results in an increase in radiation absorptance and a decrease in radiation transmittance, leading to further enhanced radiation image quality, and a layer thickness of not more than 800 μm decreases scattering of the stimulated emission, leading to further enhanced image quality, specifically, superior sharpness.

The radiation image conversion panel preferably exhibits an absorptance of 80% to 100% with respect to X-rays having an X-ray energy of 80 kVp or less. When the X-ray absorptance is not less than 80%, the required X-ray absorbing dosage is satisfied and the amount of X-rays having transmitted a radiation image conversion panel is decreased, resulting in an increase in contrast due to backscattering and leading to further enhanced radiation image quality. The X-ray absorptance can be controlled by adjustment of the filling ratio of X-ray absorbing material of the stimulable phosphor layer and the layer thickness.

The stimulable phosphor layer preferably contains a stimulable phosphor which is composed of an alkali halide as a parent component and represented by the following formula (1):

$$M^1X \cdot aM^2X' \cdot bM^3X''_3 : eA \qquad \text{formula (1)}$$

wherein $M^1$ represents an alkali metal selected from the group consisting of Li, Na, K, Rb and Cs; $M^2$ represents an alkali metal selected from the group consisting of Li, Na, K, Rb and Cs, except for the foregoing $M^1$; $M^3$ represents a trivalent metal atom selected from the group consisting of Y, La, Ce, Pr, Nd, Pm, Sm, Eu, Gd, Tb, Dy, Ho, Er, Tm, Yb and Lu; X, X' and X" each represent a halogen atom selected from the group consisting of F, Cl, Br and I; A represents a rare earth element selected from the group consisting of Eu, Tb, In, Ce, Tm, Dy, Pr, Ho, Nd, Yb, Er, Gd, Lu, Sm and Y; a, b and e are respectively $0 \leq a < 0.5$, $0 \leq b < 0.5$ and $0 < e \leq 0.2$.

In the foregoing formula (1), $M^1$ is an alkali metal atom selected from the group consisting of Li, Na, K, Rb and Cs, and of these, an alkali metal atom selected form Rb and Cs is preferred and Cs atom is more preferred. $M^2$ is an alkali metal other than $M^1$, which is selected from the group consisting of Li, Na, K, Rb and Cs, and preferably an alkali metal atom selected from the group consisting of Na, K and Rb. $M^3$ is a trivalent metal atom selected from the group consisting of Y, La, Ce, Pr, Nd, Pm, Sm, Eu, Gd, Tb, Dy, Ho, Er, Tm, Yb and Lu, and preferably a trivalent metal atom selected from the group consisting of Y, Ce, Sm, Eu, La, Gd and Lu. A is a rare earth element selected from the group consisting of Eu, Tb, In, Ce, Tm, Dy, Pr, Ho, Nd, Yb, Er, Gd, Lu, Sm and Y, and preferably Eu atom. X, X' and X" each represent a halogen atom selected from the group consisting of F, Cl, Br and I; a halogen atom selected from the group consisting of F, Cl and Br is preferred and Br atom is more preferred. In the foregoing formula (1), b is $0 \leq b < 0.5$ and preferably $0 \leq b < 10^{-2}$.

Stimulable phosphors of the foregoing formula (1) can be prepared from the following raw materials (a) to (c) according to the procedure described below:

(a) one or more compounds selected from NaF, NaCl, NaBr, NaI, KF, KCl, KBr, KI, RbF, RbCl, RbBr, RbI, CsF, CsCl, CsBr, and CsI is usable;

(b) one or more compounds selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$ is usable;

(c) Sc, Y, La, Ce, Pr, Nd, Pm, Sm, Eu, Gd, Tb, Dy, Ho, Er, Tm, Yb, Lu, Al, Ga and In.

Corresponding to the composition of a stimulable phosphor, phosphor raw materials are optimally chosen from the foregoing (a) to (c), weighed so as to satisfy the foregoing numerical range of "a", "b" and "e" of the foregoing formula (1), and dissolved. In this regard, there may be conducted sufficient mixing using a mortar, ball mill or mixer mill. Then, a prescribed amount of an acid is added to adjust a pH value (C) of the thus obtained solution so as to fall within the range of 0<C<7, and then water is evaporated.

Further, the obtained raw material mixture is charged into a heat-resistant vessel such as a silica crucible or an alumina crucible and then placed in an electric furnace to be calcined. The calcination temperature preferably is 500 to 1000° C. The calcination time, depending on the charged amount of raw materials, calcination temperature and the like, preferably is 0.5 to 6 hrs.

As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a trace amount of oxygen-introduced weakly oxidizing atmosphere.

After completion of calcination under the foregoing condition, calcined material is taken out of the electric furnace and pulverized. Thereafter, powdered calcined material may again be charged into a heat resistant vessel and then placed in an electric furnace to be recalcined under the foregoing condition to further enhance emission luminance of the phosphor. When the calcined material is allowed to cool from the calcination temperature to room temperature, the intended phosphor can be obtained by taking out the calcined material from the electric furnace and allowing it to stand in an aerial atmosphere. In this regard, the calcined material may also be cooled in the same atmosphere as in the calcination, such as a weakly reducing atmosphere or a neutral atmosphere. Alternatively, the calcined material is moved from a heating section to a cooling section within the electric furnace, followed by rapidly cooling in a weakly reducing atmosphere, neutral atmosphere or weakly oxidizing atmosphere, thereby leading to further enhanced stimulated emission luminance of the phosphor.

The stimulable phosphor layer can be formed by a process of gas phase deposition. The gas phase deposition processes usable in this invention include a vacuum deposition (or vacuum evaporation) method, a sputter deposition method, a CVD method, an ion plating method and other appropriate methods. Of these, the vacuum deposition method is preferred in this invention.

Figure 3:
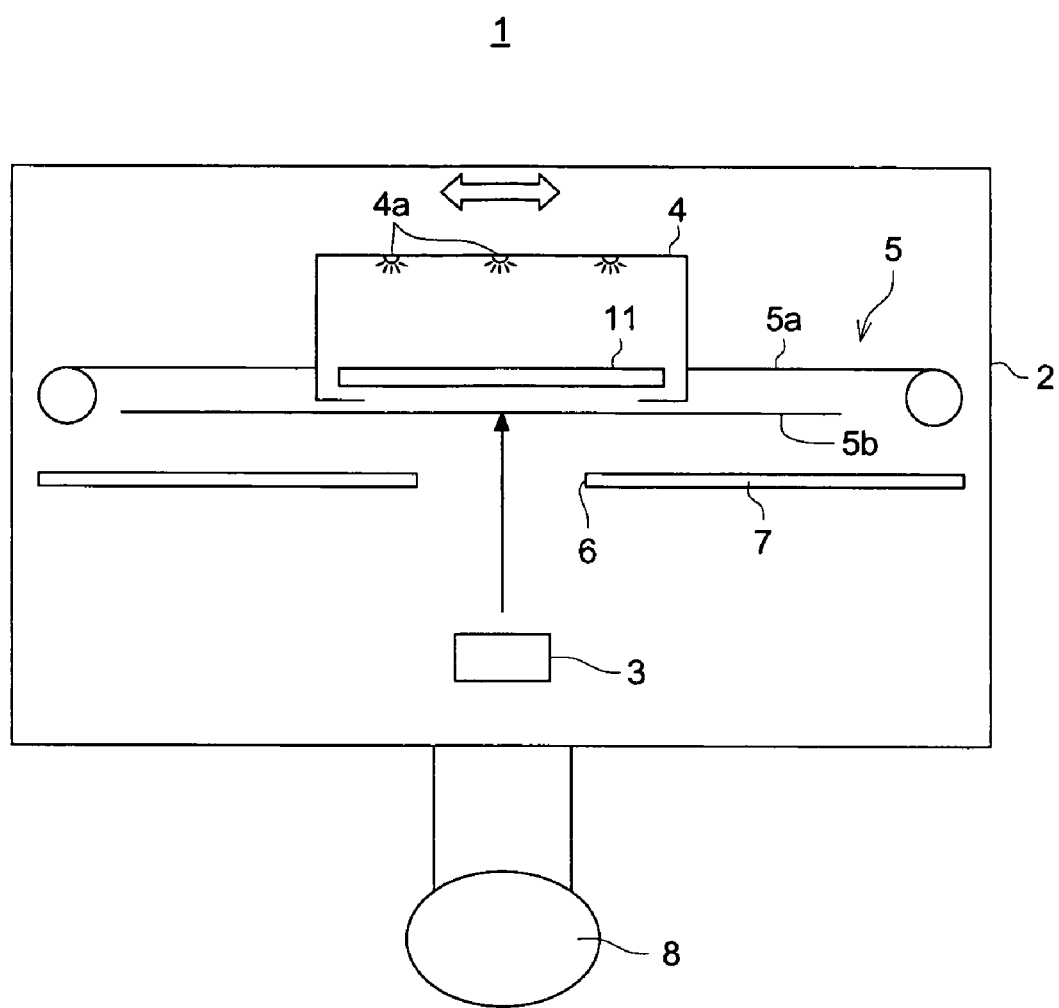
FIG. 3 illustrates a deposition apparatus.

Vacuum deposition can be performed using, for example, the vacuum deposition apparatus (1) shown in FIG. 3. The vacuum deposition apparatus (1) is provided with a vacuum vessel (12) and a vacuum pump (8) to evacuate the interior of the vacuum vessel (12) and to introduce atmospheric air; the interior of the vacuum vessel (12) is provided with an evaporation source (3) to deposit vapor onto a support (11), a support holder (4) to hold the support (11) and a support transport mechanism (5) to allow the support holder (4) to reciprocate in the horizontal direction to the evaporation source (3) to deposit vapor produced from the evaporation source (3) and a shutter (7) with a slit (6) which is provided between the support (11) and the evaporation source (3) and shield a space of from the evaporation source (3) to the support (11).

To hold a stimulable phosphor and heat it by a resistance heating method, the evaporation source (3) may be composed of an aluminum crucible wound by a heater, or a boat or a heater of a high-melting metal. Besides the resistance heating method, electron beam heating or high-frequency induction heating is also applicable to heat the stimulable phosphor. Specifically, the resistance heating method is preferred in terms of being a relatively simple constitution, ease of handling and low price, and being applicable to a large number of materials. Further, the evaporation source (3) may be a molecular beam source using a molecular source epitaxial method.

The support transport mechanism (5) is composed of, for example, a transporting wire (5a) to move the support holder (4) in the horizontal direction, a guide rail (5b) and a motor as a driving source.

The support holder (4) is preferably provided with a heater (4a) to heat the support (11). Heating the surface of the support (11) can separate or remove material adsorbed onto the support surface, and preventing generation of an impurity layer between the support surface and the stimulable phosphor, promoting closer contact and optimizing film characteristics of the stimulable phosphor layer.

To form the stimulable phosphor layer (12) on the support using the thus arranged vacuum deposition apparatus (1), the columnar crystal structure layer (12a) which is composed of a parent component of a stimulable phosphor is formed on the support, and then, the layer (12b) of a stimulable phosphor of a columnar crystal structure which is composed of a parent component and an activator component of a stimulable phosphor is formed on the columnar crystal structure layer.

Thus, the evaporation source (3) charged with a parent compound of a stimulable phosphor is set in the interior of the vacuum vessel (2), and a support (11) is mounted onto the support holder (4). Subsequently, the interior of the vacuum vessel (2) is evacuated, into which inert gas such as Ar gas or Ne gas may be introduced. Thereafter, the support holder (4) is reciprocated in the horizontal direction by the support transport mechanism (5) and when the vacuum vessel (2) reached a vacuum capable of achieving vacuum deposition (e.g., $1 \times 10^{-5}$ to $1 \times 10^{-1}$ Pa), a parent compound of a stimulable phosphor is allowed to vaporize from the heated evaporation source (3) and deposit via a slit (6) of the shutter (7) on the surface of the support (11) to grow a layer (12a) of columnar crystal structure, composed of a parent component of a stimulable phosphor up to a desired thickness. Specifically, to achieve predominant crystal growth of a (200) plane, it is preferred to maintain the vacuum vessel at a vacuum of $1 \times 10^{-2}$ to $1 \times 10^{-1}$ Pa. It is also preferred to achieve vapor deposition, while maintaining the support (or substrate) at a temperature of 50 to 200° C. using a heating device such as a halogen lamp.

Subsequently, using an evaporation source containing a mixture of a parent compound and activator of a stimulable phosphor, similarly to the foregoing, a stimulable phosphor layer (12b) is allowed to grow on the columnar crystal structure layer (12a) formed on the support (11) to a desired thickness. Both of the evaporation source containing a parent compound and the evaporation source containing a mixture of a parent component and an activator component may be arranged together inside the vacuum vessel (2). Alternatively, after forming the columnar crystal structure layer (12a) composed of a parent component, the vacuum vessel (2) is opened to an atmosphere and then an evaporation source containing a mixture of a parent component and an activator component is mounted to form the layer (12b) of a stimulable phosphor composed of a parent component and an activator component.

Further, a parent compound of a stimulable phosphor or a stimulable phosphor mixture may be molded into a tablet form by pressure compression.

Figure 2:
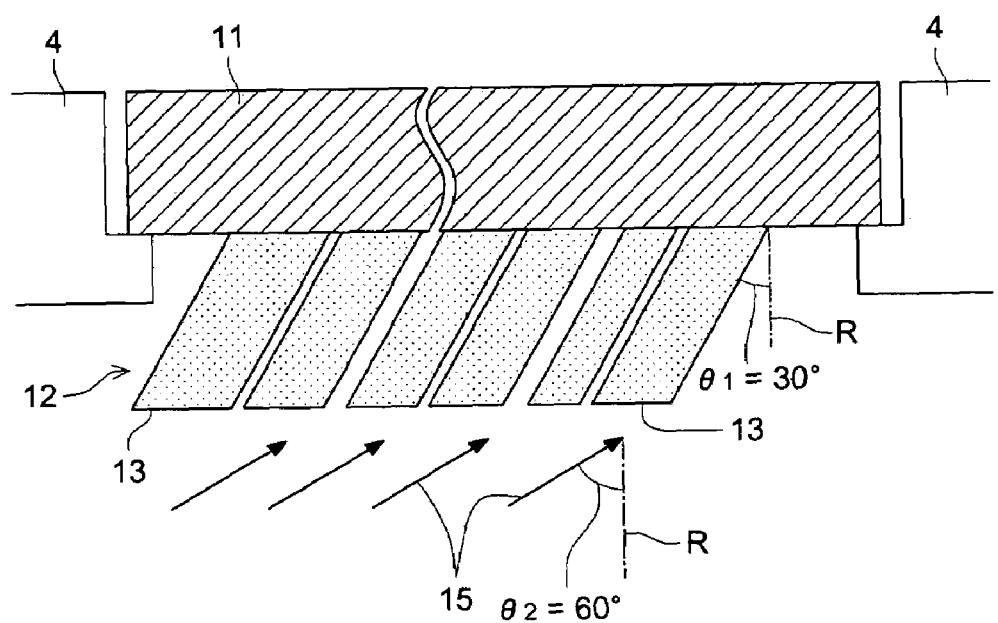
FIG. 2 illustrates a stimulable phosphor layer formed on a support by the process of vapor deposition.

FIG. 2 illustrates a specific example of the manner of forming a stimulable phosphor layer (12) through vapor deposition on a support (11). When the incident angle of a vapor stream (15) of a stimulable phosphor to the direction (R) normal to the surface of the support (11) fixed onto a holder (4) is designated as $\theta_2$ (=60° in FIG. 2) and the angle of the formed columnar crystal (13) to the direction (R) normal to the support surface is designated as $\theta_1$ (=30° in FIG. 2), $\theta_1$ is empirically a half of the $\theta_2$ and the columnar crystal (13) is formed at that angle. In FIG. 3, the incident angle (corresponding to $\theta_2$ in FIG. 2) of a vapor stream (corresponding to "15" in FIG. 2) is set at 0°.

In the foregoing, the stimulable phosphor layer (12) containing no binder is formed. The interstice (14) between columnar crystals (13) may be filled with a filler such as a binder, and in addition to reinforcement of the stimulable phosphor layer (12), there may be incorporated a highly light-absorptive material or highly light-reflective material. Thereby, reinforcement effects have been achieved and it is also effective to reduce the lateral diffusion of exciting light incident to the stimulable phosphor layer (12).

The foregoing vacuum deposition process may be divided to plural runs to form a stimulable phosphor layer. In the vacuum deposition process, co-deposition can be carried out using plural resistance heaters or electron beams to form a stimulable phosphor layer concurrently with synthesis of an intended stimulable phosphor on the support. The substrate [such as support (11), protective layer or an interlayer] may optionally be cooled or heated during deposition. After completion of the deposition, the stimulable phosphor layer (12) may optionally be heated. Further, there may be conducted vacuum deposition in which gases such as $O_2$ or $H_2$ are introduced during deposition.

In the formation of the stimulable phosphor layer through the gas-phase deposition process, the support is preferably maintained at a temperature of room temperature (rt) to 300° C., and more preferably 50 to 200° C. during the formation of the stimulable phosphor layer (12).

After formation of the stimulable phosphor layer, as described above, a protective layer may optionally be provided on a side of the stimulable phosphor layer opposite the support to physically or chemically protect the stimulable phosphor layer. The protective layer may be formed by coating a coating solution as a protective layer on the surface of the stimulable phosphor layer or by allowing a protective layer previously formed to adhere onto the stimulable phosphor layer. Materials used for the protective layer include those which are typically used for protective layers. Examples thereof include cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytetrafluoroethylene, polytrifluoroethylene, copolymer of terafluoroethylene and hexafluoropropylene, copolymer of vinylidene chloride and vinyl chloride, and copolymer of vinylidene chloride and acrylonitrile. Further, a transparent glass substrate may be used as a support. Furthermore, inorganic material such as SiC, $SiO_2$, SiN, and $Al_2O_3$ may be allowed to deposit by means of the vacuum evaporation or sputtering method to form the protective layer. The thickness of a protective layer is preferably 0.1 to 2,000 μm.

EXAMPLES

The present invention will be further described based on examples but embodiments of the invention are by no means limited to these examples.

Preparation of Radiation Image Conversion Panel

Example 1

Using a vacuum deposition apparatus (1) as shown in FIG. 3 (which was set to $\theta_1$=5° and $\theta_2$=5°, as shown in FIG. 2), a layer of columnar crystal structure which was composed of a parent component (CsBr) of a stimulable phosphor, was formed on a 1 mm thick crystallized glass (produced by Nippon Denki Glass Co.) and subsequently, further thereon, a stimulable phosphor layer composed of a parent component and an activator component (CsBr:0.0002Eu) was formed. In the evaporation apparatus (1), an aluminum shutter plate (7) was used and the distance between a support (11) and the shutter plate (7) was maintained at 60 cm and deposition was carried out while transporting the support (11) in the direction parallel to the surface of the support (11). After evacuating the interior of the deposition apparatus (1), Ar gas was introduced to adjust the vacuum to $1.0 \times 10^{-2}$ Pa and deposition was carried out while maintaining the support (11) at a temperature of 150° C. When a CsBr layer reached a thickness of 100 μm, deposition was completed and then, when a CsBr:Eu layer reached a thickness of 300 μm, deposition was completed to form a stimulable phosphor layer. Subsequently, the thus formed stimulable phosphor layer was put into a protective layer bag in an atmosphere of dry air to obtain a radiation image conversion panel having a structure of a shielded phosphor layer.

After removing the protective layer bag, the stimulable phosphor layer (CsBr:Eu) was subjected to X-ray diffractometry using an X-ray diffractometer (produced by Rigaku Denki Co., Ltd.). As a result, it was proved that the main crystal growth was a (200) plane (or in the [200] direction). Thus, columnar crystals of CsBr:Eu were formed with (200) orientation, as shown in Table 1. It was further proved that the X-ray absorptance of X-rays of 80 kVp or less was 83%. Evaluation of X-ray absorption characteristics will be described later.

Example 2

A radiation image conversion panel was prepared similarly to Example 1, except that the thickness of the CsBr:Eu layer was 500 μm. It was proved that the main crystal growth of the stimulable phosphor layer was a (200) plane and the X-ray absorptance was 89%.

Example 3

A radiation image conversion panel was prepared similarly to Example 1, except that the thickness of the CsBr:Eu layer was 800 μm. It was proved that the main crystal growth direction of the stimulable phosphor layer was a (200) plane and the X-ray absorptance was 95%.

Example 4

A radiation image conversion panel was prepared similarly to Example 1, except that the thickness of the CsBr:Eu layer was 1000 μm. It was proved that the main crystal growth direction of the stimulable phosphor layer was a (200) plane and the X-ray absorptance was 96%.

Example 5

A radiation image conversion panel was prepared similarly to Example 1, except that the thickness of the CsBr:Eu layer was 200 µm. It was proved that the main crystal growth direction of the stimulable phosphor layer was a (200) plane and the X-ray absorptance was 78%.

Comparative Example 1

A radiation image conversion panel was prepared similarly to Example 1, except that a 300 µm thick CsBr:Eu layer was formed directly on the support without forming a CsBr layer. It was proved that the main crystal growth direction of the stimulable phosphor layer was (200) plane and the X-ray absorptance was 78%.

Comparative Example 2

A radiation image conversion panel was prepared similarly to Example 1, except that 400 µm thick CsBr:Eu layer was formed directly on the support without forming a CsBr layer. It was proved that the main crystal growth direction of the stimulable phosphor layer was a (200) plane and the X-ray absorptance was 83%.

Comparative Example 3

A radiation image conversion panel was prepared similarly to Example 1, except that the thickness of the CsBr:Eu layer was 300 µm. It was proved that the main crystal growth direction of the stimulable phosphor layer was a (110) plane (or in the [110] direction) and the X-ray absorptance was 83%.

The thus prepare radiation image conversion panels were each evaluated according to the following procedure.

Luminance

After exposed to X-rays at a bulb voltage of 80 kVp, each of the radiation image conversion panels was stimulated by scanning with a semiconductor laser beam (680 nm) at 100 mW and a stimulated emission emitted from the phosphor layer was detected by a photodetector (photomultiplier having a spectral sensitivity of S-5) and the intensity was measured and defined as a luminance. The higher luminance is superior and the luminance was represented by a relative value, based on the luminance of a radiation image conversion panel of Example 1 being 100. Results thereof are shown in Table 1.

Sharpness

After exposed through a square-wave chart for MTF measurement Type No. 9 (produced by Kyokukou Co., Ltd.) to X-rays at a bulb voltage of 80 kVp, each of the radiation image conversion panels was stimulated by scanning with a semiconductor laser beam (680 nm) at 100 mW and a stimulated emission emitted from the phosphor layer was detected by a photomultiplier (photomultiplier R1305, produced by Hamamatsu Photonics Co.), converted to electric signals, subjected to analog-to-digital conversion and recorded onto a magnetic tape. The data recorded onto the magnetic tape were analyzed by a computer and a modulation transfer function (MTF) of X-ray images recorded on the magnetic tape was determined to evaluate sharpness. The MTF was represented by a MTF % at 1 spatial frequency (lp)/mm. The MTF for each of the radiation image conversion panel samples was represented by a relative value, based on the MTF of Example 1 being 100. The higher value indicates superior sharpness. Results thereof are shown in Table 1.

Evaluation of Contrast

Using each of the radiation image conversion panel samples attached with lead discs differing in diameter (5/10/20/40 mmφ), X-ray photographing was conducted to obtain image data in a manner similar to the foregoing. The difference in signal value between the center of the disc and the circumference was analyzed by a computer and a contrast value at a disc diameter of 0 mm was determined by approximation with disc diameters. Contrast values were represented by a relative value, based on the contrast value of Example 1 being 100. The less value indicates superior contrast. Results thereof are shown in Table 1.

Evaluation of X-Ray Absorption Characteristics

Using X-rays emitted from a tungsten target bulb operated at 80 kVp, X-ray irradiation was conducted under the condition of 200 Ma·sec and a reached X-ray dose (B) was measured using an ionization dosimeter (Ionex Dosemaster 2590B, produced by Toyo Medic Cp.) which was arranged at the position of 105 cm from the tungsten anode of the target bulb.

Subsequently, each of the radiation image conversion panel samples was arranged at the position of 100 cm from the tungsten anode of the target bulb and X-ray irradiation was conducted similarly to the foregoing. The dose (D) of X-rays which transmitted the radiation image conversion panel was measured using an ionization dosimeter and an X-ray absorptance (also called absorption factor or percentage absorption) o was determined based on the following equation:

TABLE 1

| Panel | Thickness (µm) | | Crystal Plane | X-ray Absorptance (%) | Luminance | Sharpness | Contrast |
|---|---|---|---|---|---|---|---|
| | CsBr Layer | CsBr:Eu Layer | | | | | |
| Example 1 | 100 | 300 | (200) | 83 | 100 | 100 | 100 |
| Example 2 | 100 | 500 | (200) | 89 | 134 | 95 | 77 |
| Example 3 | 100 | 800 | (200) | 95 | 166 | 91 | 59 |
| Example 4 | 100 | 1000 | (200) | 96 | 180 | 89 | 59 |
| Example 5 | 100 | 200 | (200) | 78 | 77 | 104 | 121 |
| Comparative Example 1 | 0 | 300 | (200) | 78 | 100 | 97 | 139 |
| Comparative Example 2 | 0 | 400 | (200) | 83 | 121 | 94 | 115 |
| Com- | 100 | 300 | (110) | 83 | 60 | 92 | 100 |

TABLE 1-continued

| Panel | Thickness (μm) | | Crystal Plane | X-ray Absorptance (%) | Luminance | Sharpness | Contrast |
|---|---|---|---|---|---|---|---|
| | CsBr Layer | CsBr:Eu Layer | | | | | |
| parative Example 3 | | | | | | | |

As apparent from the results of Table 1, radiation image conversion panels of Examples 1 to 5 in which a CsBr layer composed of a parent component was formed on the support and a CsBr:Eu layer was formed on the CsBr layer, exhibited enhanced luminance and sharpness, and low contrast, and being superior in luminance, sharpness and contrast, compared to Comparative Examples 1 to 3.

Comparative Example 3 in which the crystal growth of the CsBr:Eu layer was mainly a (110) plane (or in the [110] direction), resulted in inferior luminance, sharpness and contrast, compared to Examples 1 to 5 in which the main crystal growth of the CsBr:Eu layer was a (200) plane (or in the [200] direction). As shown in Example 4 in which the thickness of the CsBr:Eu layer was 1000 μm, superior luminance and contrast were achieved but lowered sharpness resulted, compared to Examples 1 to 3 in which the thickness of the CsBr:Eu layer was 300 μm to 800 μm. Further, Example 5 in which the thickness of the CsBr:Eu layer was 200 μm, resulted in a lowered absorptance and a lowered luminance though superior sharpness and contrast were achieved.

Accordingly, the crystal plane can be controlled by forming a CsBr layer composed of a parent component on the support and further by forming a CsBr:Eu layer composed of a parent component and an activator component on the CsBr layer as a substratum, leading to formation of a CsBr:Eu layer exhibiting superior crystallinity. Controlling the growth direction of the CsBr:Eu layer to a (200) plane and the thickness of the CsBr:Eu layer to 300 to 800 μm results superior contrast and markedly enhanced radiation image quality without deteriorating luminance and sharpness.

What is claimed is:

1. A radiation image conversion panel comprising on a support a stimulable phosphor layer comprising a stimulable phosphor, wherein the stimulable phosphor is comprised of a parent component and an activator component, and the stimulable phosphor layer comprises on the support a first layer comprising first columnar crystals of the parent component and further thereon a second layer comprising second columnar crystals of the parent component and the activator component, wherein the second columnar crystals are formed with (200) orientation and the image conversion panel exhibits an absorbency of 80% to 100% with respect to X-rays at a bulb voltage of 80 kVp or less.

2. The radiation image conversion panel of claim 1, wherein the second layer has a thickness of 300 to 800 μm.

3. The radiation image conversion panel of claim 1, wherein the stimulable phosphor layer has a thickness of 400 to 900 μm.

4. The radiation image conversion panel of claim 1, wherein the stimulable phosphor is represented by the following formula (1):

$$M^1X \cdot aM^2X' \cdot bM^3X''_3 : eA \quad \text{formula (1)}$$

wherein $M^1$ represents an alkali metal selected from the group consisting of Li, Na, K, Rb and Cs; $M^2$ represents an alkali metal other than $M^1$, selected from the group consisting of Li, Na, K, Rb and Cs; $M^3$ represents a trivalent metal atom selected from the group consisting of Y, La, Ce, Pr, Nd, Pm, Sm, Eu, Gd, Tb, Dy, Ho, Er, Tm, Yb and Lu; X, X' and X" each represent a halogen atom selected from the group consisting of F, Cl, Br and I; A represents a rare earth element selected from the group consisting of Eu, Tb, In, Ce, Tm, Dy, Pr, Ho, Nd, Yb, Er, Gd, Lu, Sm and Y; a, b and e are respectively $0 \leq a < 0.5$, $0 \leq b < 0.5$ and $0 < e \leq 0.2$.

5. The radiation image conversion panel of claim 4, wherein the stimulable phosphor is represented by the following formula:

$$M^1X:eA$$

wherein $M^1$, X, A and e are the same as defined in claim 5 and $M^1X$ and eA represent a parent component and an activator component, respectively.

6. The radiation image conversion panel of claim 1, wherein the stimulable phosphor is CsBr:eEu in which e is $0 < e \leq 0.2$.

7. The radiation image conversion panel of claim 6, wherein CsBr and eEu represent a parent component and an activator component, respectively.

8. The radiation image conversion panel of claim 1, wherein the parent component is an alkali halide.

9. A method of preparing a radiation image conversion panel comprising on a support a stimulable phosphor layer comprising a stimulable phosphor, wherein the stimulable phosphor is comprised of a parent component and an activator component; and the stimulable phosphor layer comprises on the support a first layer comprising columnar crystals of the parent component and further thereon a second layer comprising columnar crystals of the parent component and the activator component; and the method comprising the steps of:

(a) depositing the parent component onto the support to grow first columnar crystals to form the first layer and, (b) depositing the activator component together with the parent component onto the first columnar crystals to grow second columnar crystals to form the second layer, wherein the second columnar crystals are grown with (200) orientation and the radiation image conversion panel exhibits an absorbency of 80% to 100% with respect to X-rays at a bulb voltage of 80 kVp or less.

10. The method of claim 9, wherein the second layer has a thickness of 300 to 800 μm.

11. The method of claim 9, wherein the stimulable phosphor layer has a thickness of 400 to 900 μm.

12. The method of claim 9, wherein the stimulable phosphor is represented by the following formula (1):

$$M^1X \cdot aM^2X' \cdot bM^3X''_3 : eA \quad \text{formula (1)}$$

wherein $M^1$ represents an alkali metal selected from the group consisting of Li, Na, K, Rb and Cs; $M^2$ represents an alkali metal other than $M^1$, selected from the group consisting of Li, Na, K, Rb and Cs; $M^3$ represents a trivalent metal atom selected from the group consisting of Y, La, Ce, Pr, Nd, Pm, Sm, Eu, Gd, Tb, Dy, Ho, Er, Tm, Yb and Lu; X, X' and X" each represent a halogen atom selected from the group consisting of F, Cl, Br and I; A represents a rare earth element selected from the group consisting of Eu, Tb, In, Ce, Tm, Dy, Pr, Ho, Nd, Yb, Er, Gd, Lu, Sm and Y; a, b and e are respectively $0 \leq a < 0.5$, $0 \leq b < 0.5$ and $0 < e \leq 0.2$.

13. The method of claim 12, wherein the stimulable phosphor is comprised of a parent component and an activator component and represented by the following formula:

$M^1X:eA$ wherein $M^1$, X, A and e are the same as defined in claim 12 and $M^1X$ and eA are the parent component and the activator component, respectively.

14. The method of claim 9, wherein the stimulable phosphor is CsBr:eEu in which e is $0 < e \leq 0.2$.

15. The method of claim 14, wherein CsBr and eEu are the parent component and the activator component, respectively.

16. The method of claim 9, wherein the parent component is an alkali halide.

17. The method of claim 9, wherein in steps (a) and (b), depositing is performed while maintaining a vacuum at a pressure of $1 \times 10^{-2}$ to $1 \times 10 \times^{-1}$ Pa.

* * * * *